United States Patent [19]

Claude et al.

[11] Patent Number: 4,907,083
[45] Date of Patent: Mar. 6, 1990

[54] POINT SYNCHRONIZATION GENERATING CIRCUIT FOR TELEVISION DISPLAY AND ITS USE FOR SYMBOL INCRUSTATION

[75] Inventors: Gillet Claude, Montreuil; Voisin Gérard, Trappes; Xavier Maitre, St Mande, all of France

[73] Assignee: Thomson CSF, Paris, France

[21] Appl. No.: 239,121

[22] Filed: Aug. 31, 1988

[30] Foreign Application Priority Data

Sep. 1, 1987 [FR] France ................. 87 12158

[51] Int. Cl.⁴ ........................................ H04N 5/04
[52] U.S. Cl. .................................. 358/148; 358/183
[58] Field of Search ............... 358/22, 148, 149, 150, 358/151, 152, 158, 183, 160; 340/732, 733, 734, 744, 747, 748, 814; 328/63, 66, 67, 72, 109, 119, 130.1

[56] References Cited

U.S. PATENT DOCUMENTS 4,203,130  5/1980  Doumit et al. .................. 358/183
4,600,895  7/1986  Landsman ....................... 358/158

FOREIGN PATENT DOCUMENTS 0005672  11/1979  European Pat. Off. .
2524746  10/1983  France .

Primary Examiner—John W. Shepperd
Assistant Examiner—Michael D. Parker
Attorney, Agent, or Firm—Cushman, Darby & Cushman

[57] ABSTRACT

The circuit disclosed provides for operation in wide ranges of temperature with high temporal stability. It comprises a quartz clock providing the point frequency, a delay circuit with N outputs to delay the clock signal by 1 to N increments with a value 1/NFP from one output to the following one. A decoding and control logic circuit receives the N shifted signals ad the external line synchronization and codifies the rank of the first shifted signal which follows the line synchronization. A selection logic circuit controlled by this information on rank selects the corresponding output.

2 Claims, 3 Drawing Sheets

POINT SYNCHRONIZATION GENERATING CIRCUIT FOR TELEVISION DISPLAY AND ITS USE FOR SYMBOL INCRUSTATION

BACKGROUND OF THE INVENTION

1. Field of the Invention

The present invention relates to a point synchronization generating circuit for television display and to a use, more particularly envisaged for this circuit, which consists in the incrustation of synthetic video symbols on the image.

2. Description of the Prior Art

Television networks necessarily have a center for the processing and working of video sources. To enable easier working and more agreeable telecasting, synchronous video sources must be used. This result is obtained fairly simply for a studio consisting of video cameras of the same type and with a control center: a synchronization generator gives a main clock signal at the line and frame rate and controls the various cameras as well as the control center.

Video sources have very quickly been becoming diversified. Videotape recorders, independent portable television cameras, circuits for the incrustation of alphanumeric characters and symbols, solid-state circuit television cameras with charge transfer, etc. have emerged. Thus, line by line synchronization no longer suffices. The time base of some of these video sources, especially solid-state television cameras, are at high frequencies corresponding to the point frequency of the plotting and may go up to 10 MHz. For these configurations, time bases are then used with oscillators at high frequencies, where the frequency is automatically linked to the line synchronization signal chosen as a reference. The oscillator may consist of a standard circuit with a self-induction coil and capacitor, the frequency of which is checked by a discriminator. The error voltage of the discriminator is obtained by comparing the frequency of the signal given with that of the external reference signal. This is the so-called "locked generators" technique. In independent mode, namely when they are not automatically linked, these generators are imprecise and unusable.

An improvement has emerged wherein these oscillators are replaced by a quartz oscillator, the frequency of which is shifted by additional circuits of the series or parallel capacitor type, varicap type etc. These oscillators are more precise but are limited as regards temperature. They cannot meet severe standards imposed, especially for military equipment, for example, for temperatures of −40° C. to +125° C.

To work properly, the above-mentioned generators with self-inductance coils and capacitors or quartz generators need an external signal to produce automatic linking of frequency. The signal given by the generator is not pure. It is affected by a certain degree of instability due to the constant correction of the automatic link and due to the noise in the total operating band. The frequency of the oscillators is never high enough to eliminate the frequency correction due to the automatic link, resulting in offsets from one line to another in the picture.

For the incrustation of alphanumerical characters or symbols, the above-mentioned phenomena produce distortions by horizontal offsets of the symbols.

An aim of the invention is to remove these drawbacks, especially thermal limitations and the difficulty of incrustating symbols.

SUMMARY OF THE INVENTION

The invention proposes the making of a point synchronization generating circuit for a video picture scanned line by line at a line synchronization rate corresponding to the television standard used, said circuit comprising:

a quartz circuit with a frequency corresponding to the point frequency FP of said standard;

a delay circuit with N outputs to delay the clock signal by 1 to N increments, with a value 1/NFP, from one output to the next one;

a decoding and control logic circuit receiving the N shifted clock signals and the line synchronization signal, determining and codifying the rank of the first shifted clock signal which follows the line synchronization signal;

and a selection logic circuit which receives the N shifted clock circuits and the encoded information on rank to select the shifted clock signal of corresponding rank which constitutes the clock signal automatically linked in phase with the line synchronization signal.

The base generator is thus a quartz clock, hence a very high stability generator with a very slow frequency drift, enabling temporal phase corrections as long as the deviation is smaller than or equal to the delay increment.

BRIEF DESCRIPTION OF THE DRAWINGS

The special features and advantages of the invention will appear in the following description, which is given as an example and made with reference to the appended figures of which.

DESCRIPTION OF PREFERRED EMBODIMENTS

Figure 1:
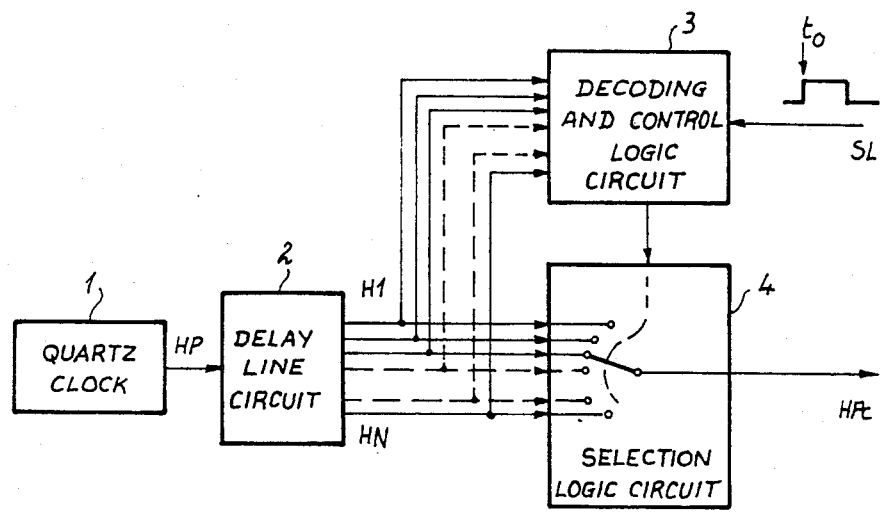
FIG. 1 is a simplified diagram of a point synchronization generating circuit according to the invention.
Figure 3:
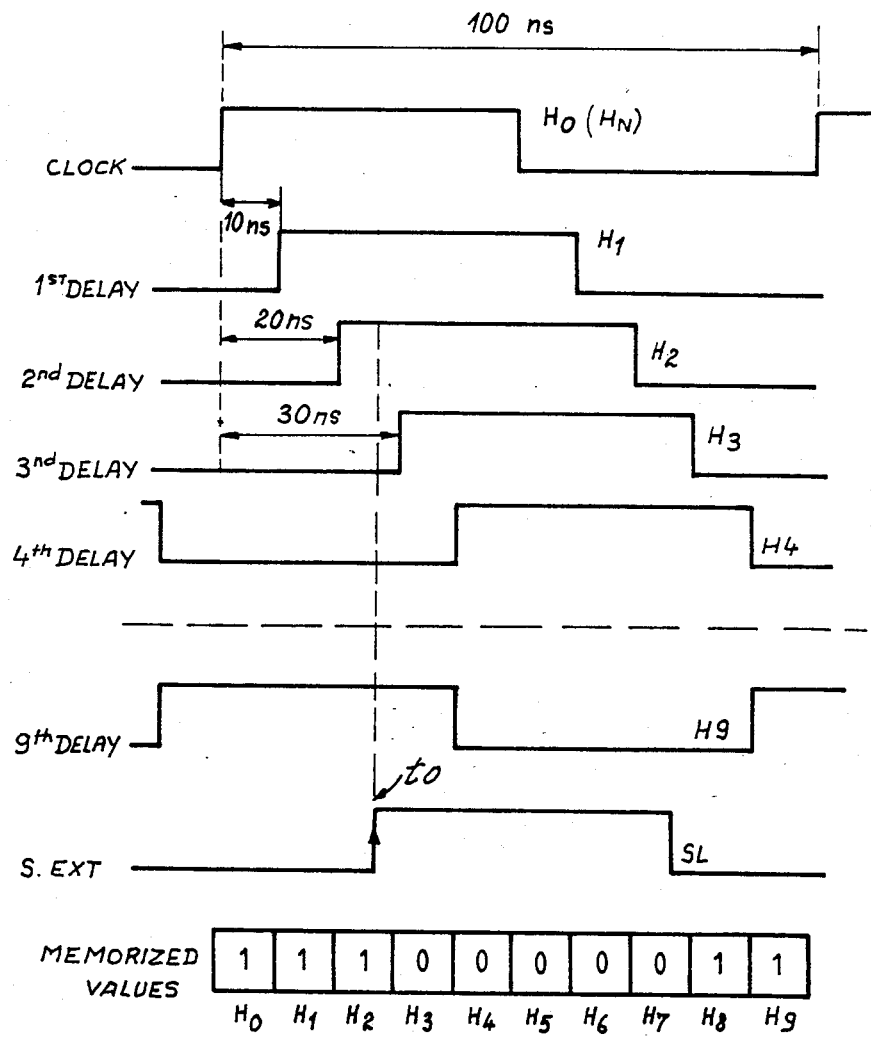
FIG. 3 shows waveforms relating to the operation of the circuit according to FIG. 1.
Figure 5:
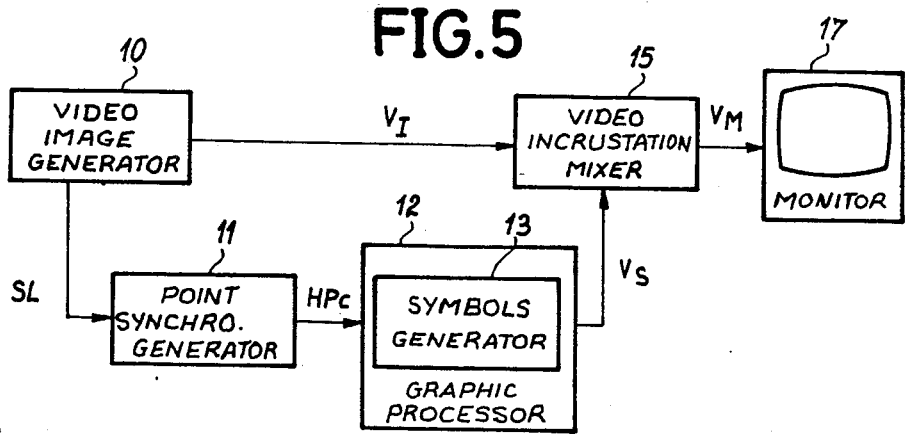
FIG. 5 is a block diagram corresponding to a use of the point synchronization generating circuit according to the invention to achieve symbol incrustation on a television video picture.

Referring to FIG. 1, the point synchronization generating circuit has a quartz clock 1 which delivers a clock signal HP with a period TP, corresponding to the point period of the television standard envisaged. A delay line circuit 2 produces an overall delay equal to the period TP and comprises a number N of outputs to produce N successive delay increments with a value of TP/N. These signals are marked H1 to HN, the signal HN being in phase with the signal HP of the following period. The shifting of these signals is shown in FIG. 3. The shifted outputs H1 to HN are applied firstly, to a decoding and control logic circuit 3 and, secondly, to a selection logic circuit 4. The logic circuit 3 also receives the line synchronization signal SL of an ancillary television picture generating circuit (FIG. 5).

Figure 2:
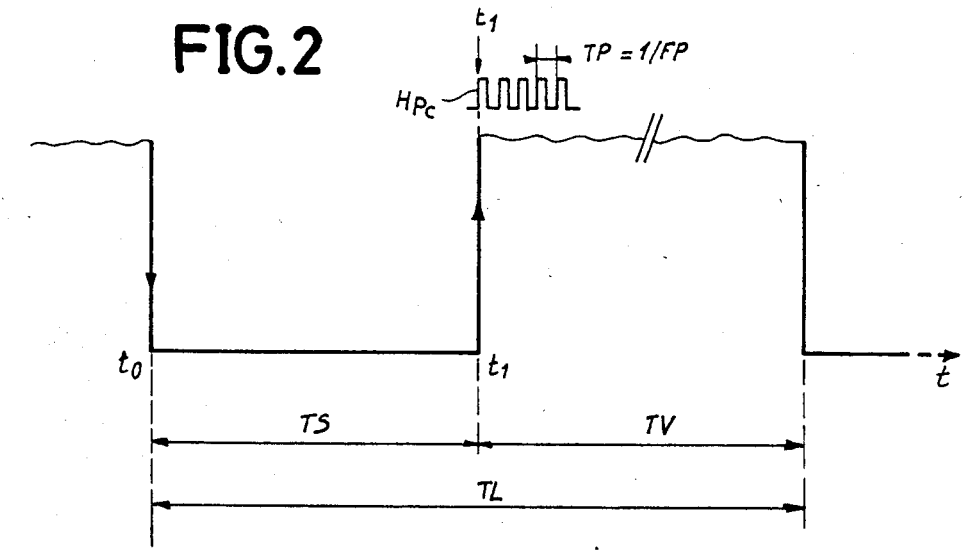
FIG. 2 shows a waveform relating to the television standard and to the problem to be resolved.

Referring to FIG. 2, the reference instant to corresponds to the leading edge of the line synchronizing signal SL. It takes effect at the end of a line exploration of the video picture. The instant t1 corresponds to the end of the line blanking interval TS and to the start of the video interval TV of the following video line and so on, to the line period TL. The line blanking interval TS is 11 microseconds for example. During this interval TS, the point synchronization generating circuit has the task of placing the point clock signal HP in phase (with a precision at least equal to the increment TP/N) with the start of the line video scan at the instant t1 as represented by the signal HPc which is the locked clock signal delivered at the output of the selection logic circuit 4. By way of example, it is assumed that the point frequency is 10 MHz, and the period TP is therefore 100 nanoseconds. The line blanking interval TS is very great as compared with the point period TP, and this interval TS is amply sufficient to produce the desired automatic phase link taking into account the delays provided by the different circuits 2 to 4, forming the automatic control chain.

The decoding and control logic circuit 3 determines and codifies the rank of the first shifted clock signal HJ (H3 in the example of FIG. 3, considering the transition 1-0 of the external signal SL) which follows the considered reference instant to of the synchronization pulse SL. The selection logic circuit 4 receives the encoded rank J information and selects the corresponding output HJ which is indicated by the reference HPc signifying that the point clock is locked.

Figure 4:
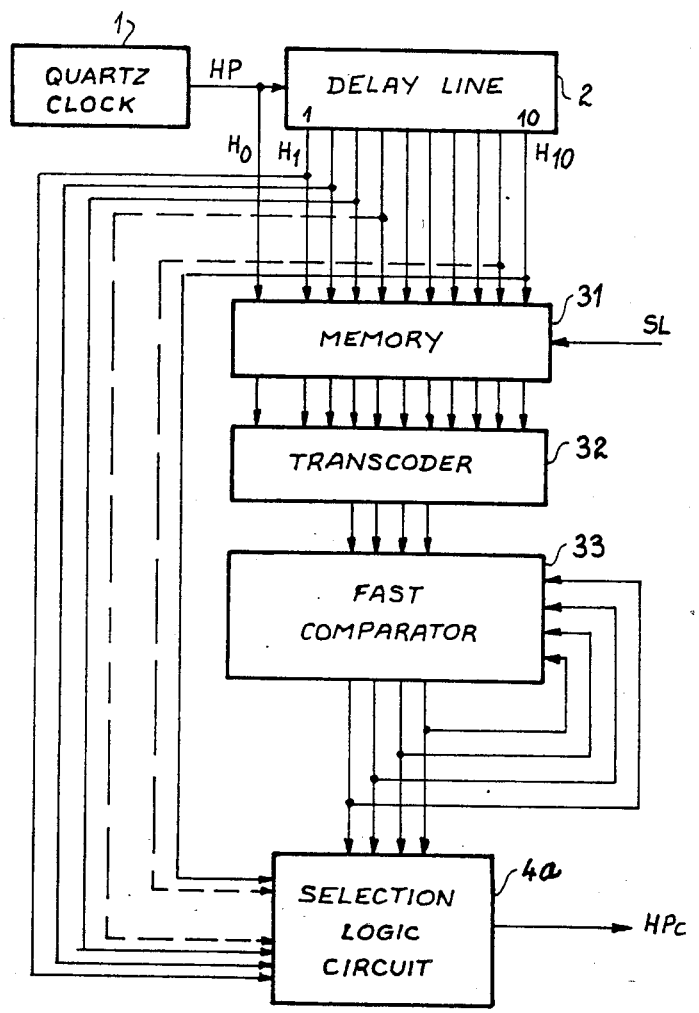
FIG. 4 represents an embodiment of a point synchronization generating circuit according to the invention.

FIG. 4 represents one embodiment. A 10 MHz clock is considered. This clock is applied to a delay line 2 with a total delay of 100 ns, comprising 10 outputs, H1 to H10, shifted by each respectively 10 ns. The clock signal HP also constitutes a reference H0 which, in this case, is in phase with the signal H10. The state of the 10 delayed outputs, H1 to H10, and that of the non-delayed signal H0 are memorized in the memory circuit 31 at the reference instant to defined by an edge of the external driving synchronization signal SL. The memorized data represent the successive states of HP, shifted by 10 ns from one to the next, during a period of this clock signal with a frequency of 10 MHz. These states are transmitted to a transcoding circuit 32 which replaces them by a 4-bit binary word giving the rank of the clock signal closest to the instant to. In the example of FIG. 3, this signal is the output H3 and hence, has the rank 3, which results in the code. 0011 at the output of the transcoder 32.

The logic 3 is complemented by a fast comparator 33 which compares this indication of rank with that existing during the previous line scan and which sends the selection logic circuit 4a either the same information on rank if it is unchanged, or a new indication of rank (reduced or increased by a unit corresponding to an increment of 10 ns) if there has been a variation during the considered line scan period TL. To simplify the description, the synchronizations of the circuits 32, 33 and 4a have not been indicated: these synchronizations take place at the rate of the signal SL, in taking into account successive delays given by these different circuits.

The line blanking period TS is a multiple of the clock period equal, for example, to 110 times this period, and the selection of the signal HPC ensures the re-setting of the phase at the instant T1 with a shift smaller than a 10 ns delay increment considered.

The mode used for locking by phase shift enables accurate operation in a wide range of temperatures and is suited to military standards. The locking stability and its precision (about one-tenth of the point period in the above-mentioned example) enables the production of character and symbol incrustations without any appreciable visual effect of horizontal offsets.

The selection logic circuit 4a makes it possible to cause the phase of the output signal HPC to change by increments of 10 ns to make it identical to that selected for the external line synchronization SL. This phase re-setting operation is done during the synchronization time TS, or for major shifts when starting up, during the line suppression stage. At all events, the phase setting is done outside the useful part TV of the video line, the maximum shift being 10 ns in the example envisaged. This assembly can be used in all systems comprising different sets of video generators designed to be coupled to one another and, especially, in the presence of solid state cameras or video tape recorders.

FIG. 5 shows a use of a circuit 11 according to the invention to achieve symbol incrustation in a video display system comprising a television video picture generator 10 which delivers the picture video signal VI. A graphic processor 12, comprising a symbol generator 13, receives the locked point clock signal HPc from the generator 11 and delivers the symbol video signal VS locked in temporary phase with the incrustation mixer 15. The resulting mixed video signal $V_M$ is transmitted to an ancillary display device 17. The picture generator 10 may have several video sources, for example two television cameras, and the video signal VI may already result from a mixing of several video signals.

What is claimed is:

1. A point synchronization generating circuit for a video picture scanned line by line at a line synchronization rate indicated by a line synchronization signal corresponding to a television standard used, said circuit comprising:
   a quartz circuit producing a clock signal with a frequency corresponding to a point frequency FP of said standard;
   a delay circuit with N outputs, to delay the clock signal by 1 through N increments, with a value 1/N·FP, successively from one of said N outputs to the next;
   a memory for storing states of the N delayed clock signals at a reference instant of reception of said line synchronization signal;
   a transcoder, to convert the stored states into a ranked binary word codifying a rank of a first clock signal which follows said line synchronization signal;
   a selection logic circuit, to select one of the N delayed clock signals, under the control of a selection binary word; and
   a fast comparator, to compare said ranked binary word with the selection binary word used during the preceding line scanning, and to determine a new selection binary word, for a next line scanning.

2. A point synchronization generating circuit according to claim 1 further comprising
   a television video picture generator giving a picture video signal and said line synchronization signal;
   a point synchronization generator receiving said line synchronization signal and producing an output;
   a graphic processor receiving said output and comprising a symbols generator, and producing a symbological video output; and
   an incrustation mixer for mixing said symbological video output with the picture video signal to give the mixed video signal to an ancillary incrustation device.

* * * * *